United States Patent
Vasseur et al.

(10) Patent No.: US 10,320,824 B2
(45) Date of Patent: Jun. 11, 2019

(54) ANOMALY DETECTION USING NETWORK TRAFFIC DATA

(71) Applicant: Cisco Technology, Inc., San Jose, CA (US)

(72) Inventors: Jean-Philippe Vasseur, Anchorage, AK (US); Grégory Mermoud, Veyras (CH); Laurent Sartran, Palaiseau (FR)

(73) Assignee: Cisco Technology, Inc., San Jose, CA (US)

( * ) Notice: Subject to any disclaimer, the term of this patent is extended or adjusted under 35 U.S.C. 154(b) by 95 days.

(21) Appl. No.: 14/989,920

(22) Filed: Jan. 7, 2016

(65) Prior Publication Data

US 2016/0219070 A1 Jul. 28, 2016

Related U.S. Application Data

(60) Provisional application No. 62/106,453, filed on Jan. 22, 2015.

(51) Int. Cl.
| | |
|---|---|
| *H04L 9/00* | (2006.01) |
| *H04L 29/06* | (2006.01) |
| *H04L 12/707* | (2013.01) |
| *G06N 20/00* | (2019.01) |
| *H04L 12/725* | (2013.01) |
| *G06F 21/55* | (2013.01) |
| *H04L 12/751* | (2013.01) |

(52) U.S. Cl.
CPC ........ *H04L 63/1425* (2013.01); *G06F 21/552* (2013.01); *G06N 20/00* (2019.01); *H04L 45/22* (2013.01); *H04L 45/306* (2013.01); *H04L 45/02* (2013.01)

(58) Field of Classification Search
CPC .................................................. H04L 63/1425
USPC ........................................................... 726/23
See application file for complete search history.

(56) References Cited

U.S. PATENT DOCUMENTS

| | | | |
|---|---|---|---|
| 7,519,860 B2 * | 4/2009 | Hatonen | G06K 9/6284 714/26 |
| 8,095,635 B2 | 1/2012 | Wang et al. | |
| 8,489,720 B1 * | 7/2013 | Morford | H04L 43/0858 709/223 |
| 2010/0014420 A1 * | 1/2010 | Wang | H04L 41/142 370/229 |
| 2010/0034102 A1 * | 2/2010 | Wang | H04L 43/0876 370/252 |

(Continued)

OTHER PUBLICATIONS

Rodriguez, et al., "Predicting the Quality Level of a VoIP Communication through Intelligent Learning Techniques", ICDS 2013, The 7th International Conference on Digital Society, Feb. 2013, 6 pages, Nice, France.

(Continued)

*Primary Examiner* — Christopher J Brown
(74) *Attorney, Agent, or Firm* — Behmke Innovation Group LLC; James Behmke; Stephen D. LeBarron

(57) ABSTRACT

In one embodiment, a device in a network receives traffic metrics for a plurality of applications in the network. The device populates a feature space for a machine learning-based anomaly detector. The device identifies a missing dataset in the feature space for a particular one of the plurality of applications. The device adjusts how traffic is sent in the network, to capture the missing dataset.

18 Claims, 8 Drawing Sheets

(56) References Cited

U.S. PATENT DOCUMENTS

| | | | |
|---|---|---|---|
| 2012/0236860 A1* | 9/2012 | Kompella | H04L 45/18 370/392 |
| 2014/0222748 A1 | 8/2014 | Mermoud et al. | |
| 2015/0142962 A1* | 5/2015 | Srinivas | H04L 41/0816 709/224 |
| 2015/0186798 A1 | 7/2015 | Vasseur et al. | |
| 2015/0193696 A1 | 7/2015 | Vasseur et al. | |

OTHER PUBLICATIONS

Sajassi, et al., "BGP MPLS Based Ethernet VPN", Network Working Group, Internet Draft, <draft-ietf-l2vpn-evpn>, Oct. 2014, 52 pages, Internet Engineering Task Force Trust.

Wagner, et al., "Machine Learning Approach for IP-Flow Record Anomaly Detection", IFIP Networking 2011, May 2011, 13 pages, Valencia, Spain.

\* cited by examiner

ANOMALY DETECTION USING NETWORK TRAFFIC DATA

RELATED APPLICATIONS

This application claims priority to U.S. Provisional Application No. 62/106,453, filed Jan. 22, 2015, entitled: "ANOMALY DETECTION USING NETWORK TRAFFIC DATA," by Vasseur et al., the contents of which are herein incorporated by reference.

TECHNICAL FIELD

The present disclosure relates generally to computer networks, and, more particularly, to detecting an anomaly in a network using network traffic data.

BACKGROUND

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
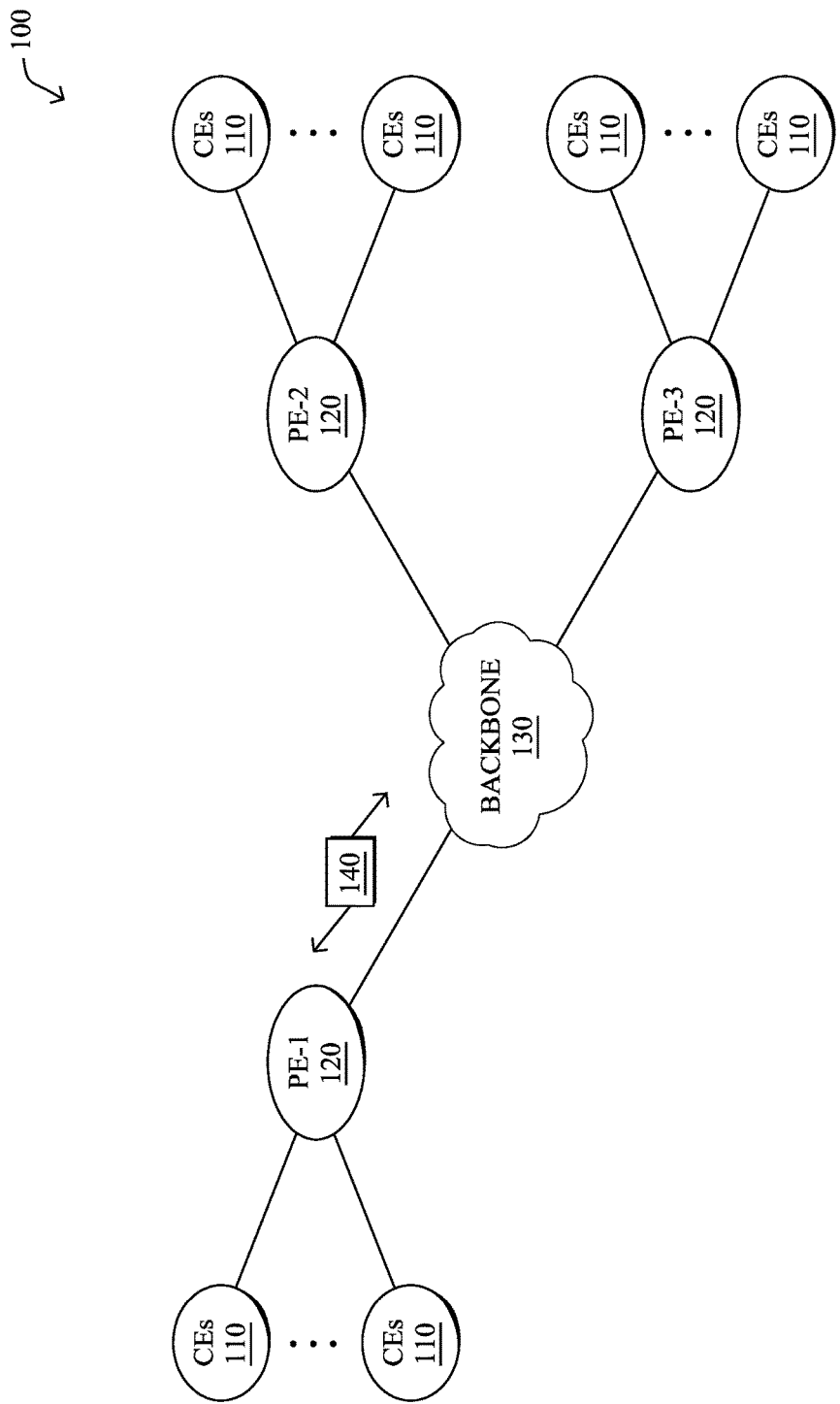
FIGS. 1A-1B illustrate an example communication network.

According to one or more embodiments of the disclosure, a device in a network receives traffic metrics for a plurality of applications in the network. The device populates a feature space for a machine learning-based anomaly detector. The device identifies a missing dataset in the feature space for a particular one of the plurality of applications. The device adjusts how traffic is sent in the network, to capture the missing dataset.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, router 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B 1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
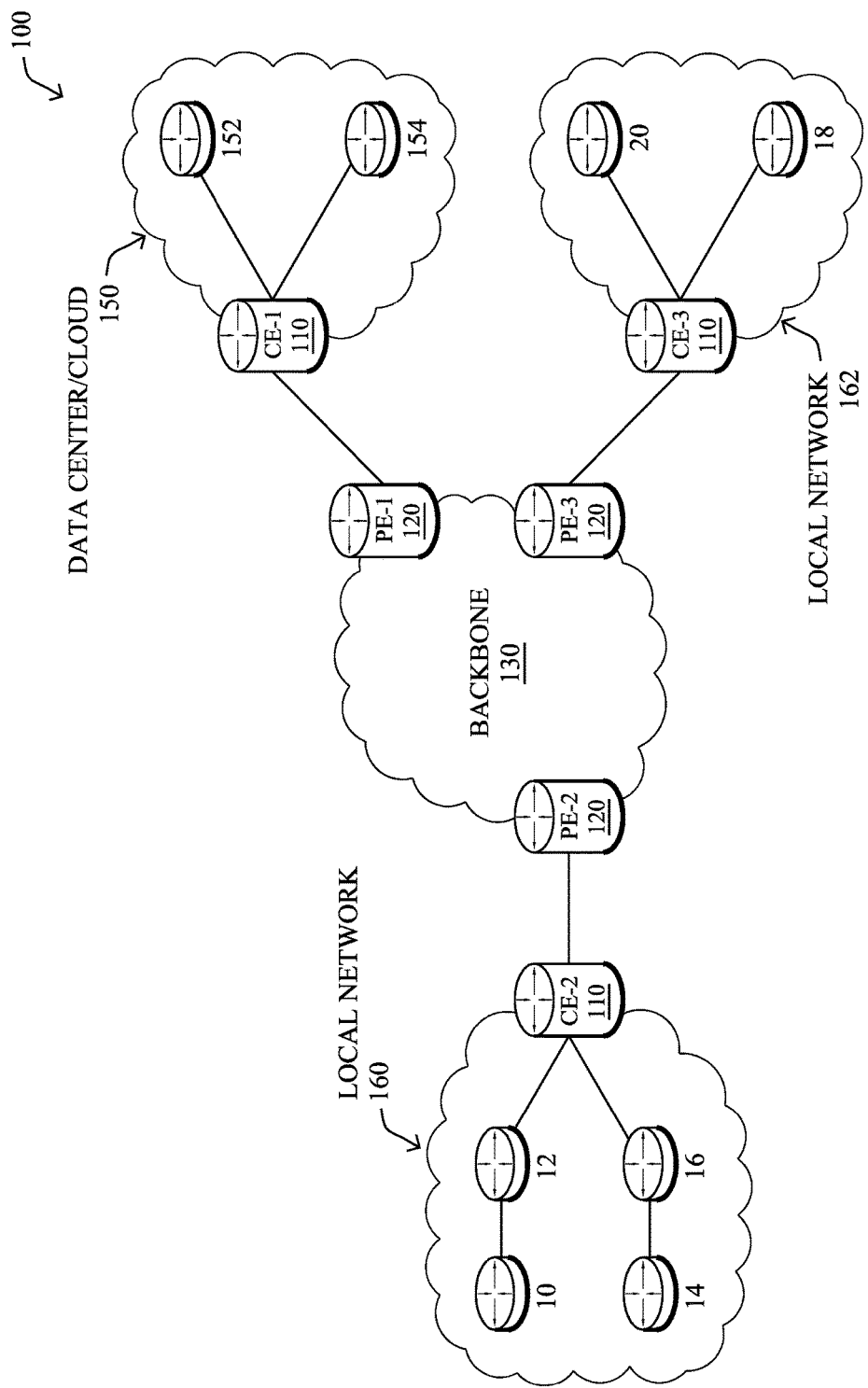

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, devices, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical devices), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
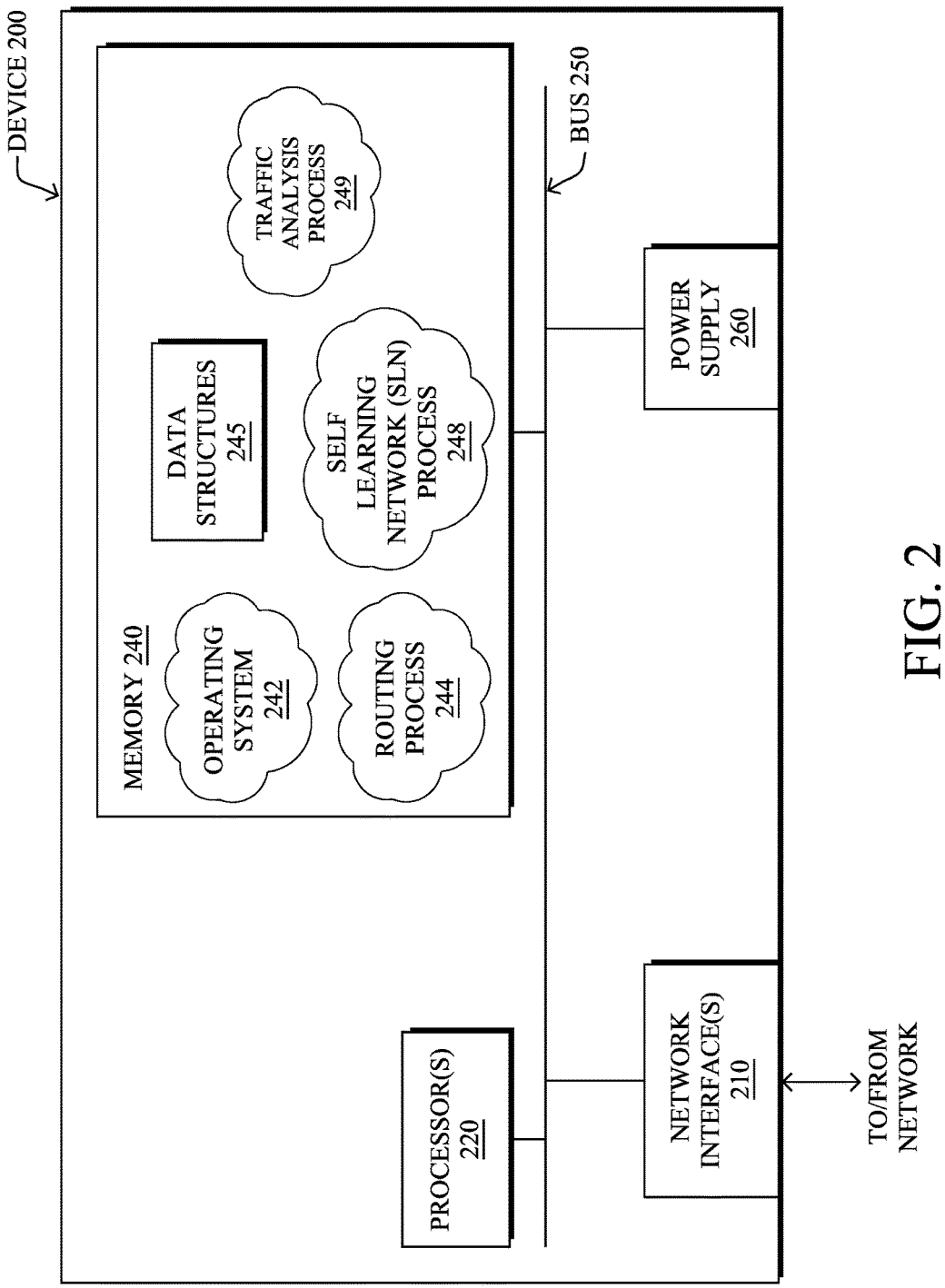
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248 and/or a traffic analysis process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points).

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

Figure 3:
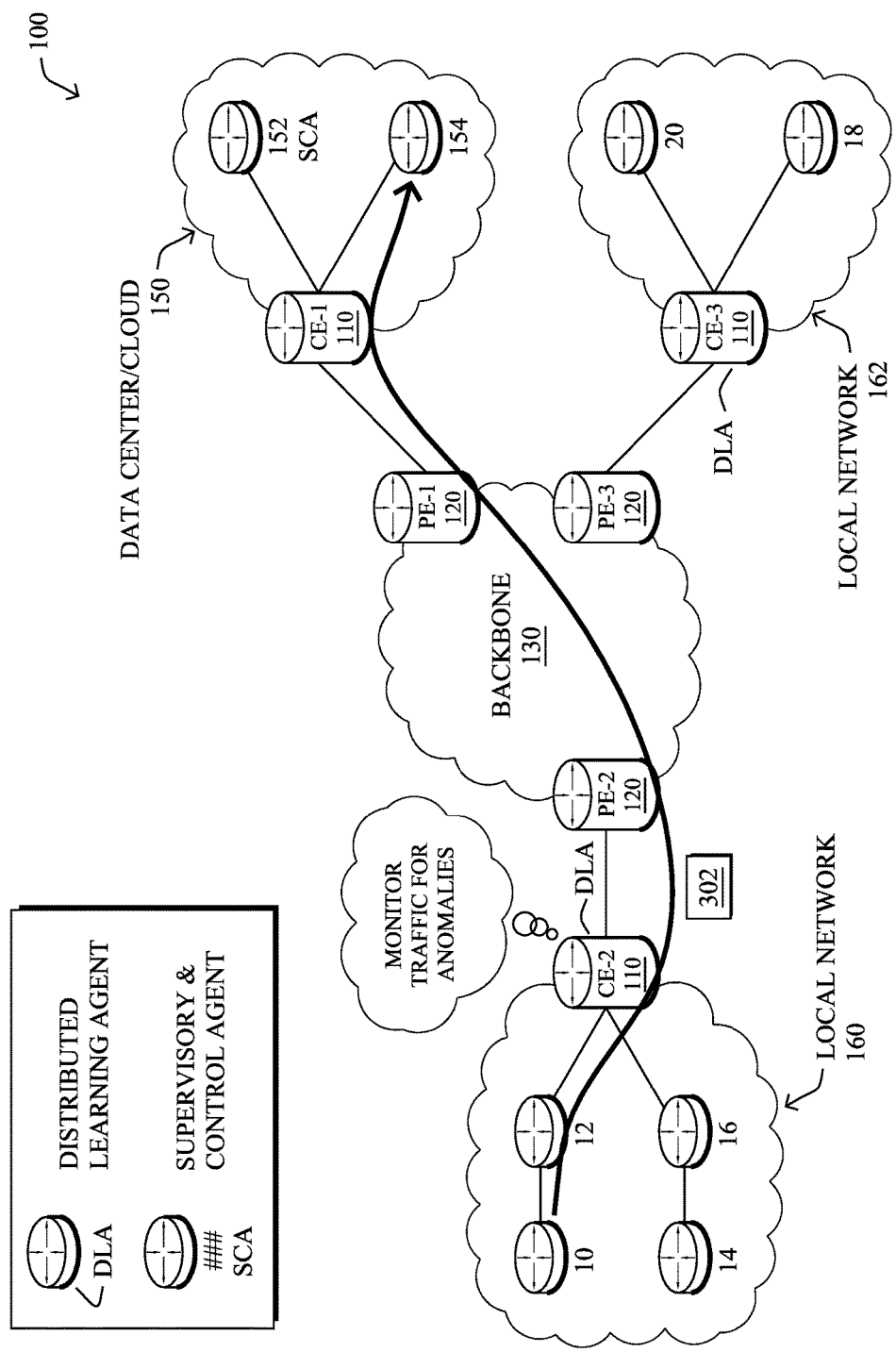
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248 and/or traffic analysis process 249). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

Typically, network tomography and monitoring has been achieved via explicit and active monitoring of network properties, e.g., using probes sent at regular time intervals. However, this approach has several drawbacks: (i) it does not scale well to fine-grained measurements, both in time and in (topological) space, as it requires sending a very large number of probes at short time intervals or along multiple paths, (ii) it cannot capture accurately the application-specific properties, and (iii) it imposes a traffic overhead, which can become very substantial for large networks. For the sake of illustration, even reactive based approaches making use of very lightweight forms of probing (e.g., Performance Routing version 3 from Cisco Systems, Inc.) have shown severe scalability issues despite the use of hierarchical and dedicated probe generators and collectors.

As described in greater detail below, the techniques herein allow the network traffic itself to be used as a sensor of the network state. Indeed, certain new technologies allow for application awareness to be built into the network infrastructure. For example, certain networking devices may use the Application Visibility and Control (AVC) mechanism or Network Based Application Recognition (NBAR) mechanism of Cisco Systems, Inc., or similar mechanisms of others, to allow a networking device to detect and monitor traffic flows, potentially on a per-application basis. Notably, AVC also allows enabling policies on a per-application basis, e.g., for granular control of application bandwidth usage. However, while these technologies provide raw data about the application experience, they do not provide any insight into the actual state of the network.

Anomaly Detection Using Network Traffic Data

The techniques herein provide a system that uses network traffic itself as a sensor for the network state, e.g., as opposed to actively sending probes to determine the network state. In some aspects, the techniques herein may be used in conjunction with existing network mechanisms such as AVC, Netflow (e.g., a mechanism that distinguishes different traffic flows and generates traffic flow records), OnePK by Cisco Systems, Inc., etc., to collect network traffic data. Such data may then be used to build a statistical model capable of inferring non-observed network properties. In a first aspect, the system may include a feature constructor, which aggregates the variety of asynchronous updates from various data sources, therefore yielding a synchronous sequence of partially observed feature vectors. In another aspect, the system may include a learning machine configured to construct a statistical model out of these partially observed feature vectors, and infer unobserved network properties. In a further aspect, the system may include an exploration module that controls the system so as to achieve an optimal tradeoff between constructing an accurate statistical model and maximizing the application experience.

Specifically, according to one or more embodiments of the disclosure as described in detail below, a device in a network receives traffic metrics for a plurality of applications in the network. The device populates a feature space for a machine learning-based anomaly detector. The device identifies a missing dataset in the feature space for a particular one of the plurality of applications. The device adjusts how traffic is sent in the network, to capture the missing dataset.

Illustratively, the techniques described herein may be performed by hardware, software, and/or firmware, such as in accordance with the traffic analysis process 249, which may include computer executable instructions executed by the processor 220 (or independent processor of interfaces 210) to perform functions relating to the techniques described herein, e.g., in conjunction with routing process 244 (and/or SLN process 248).

Figure 4:
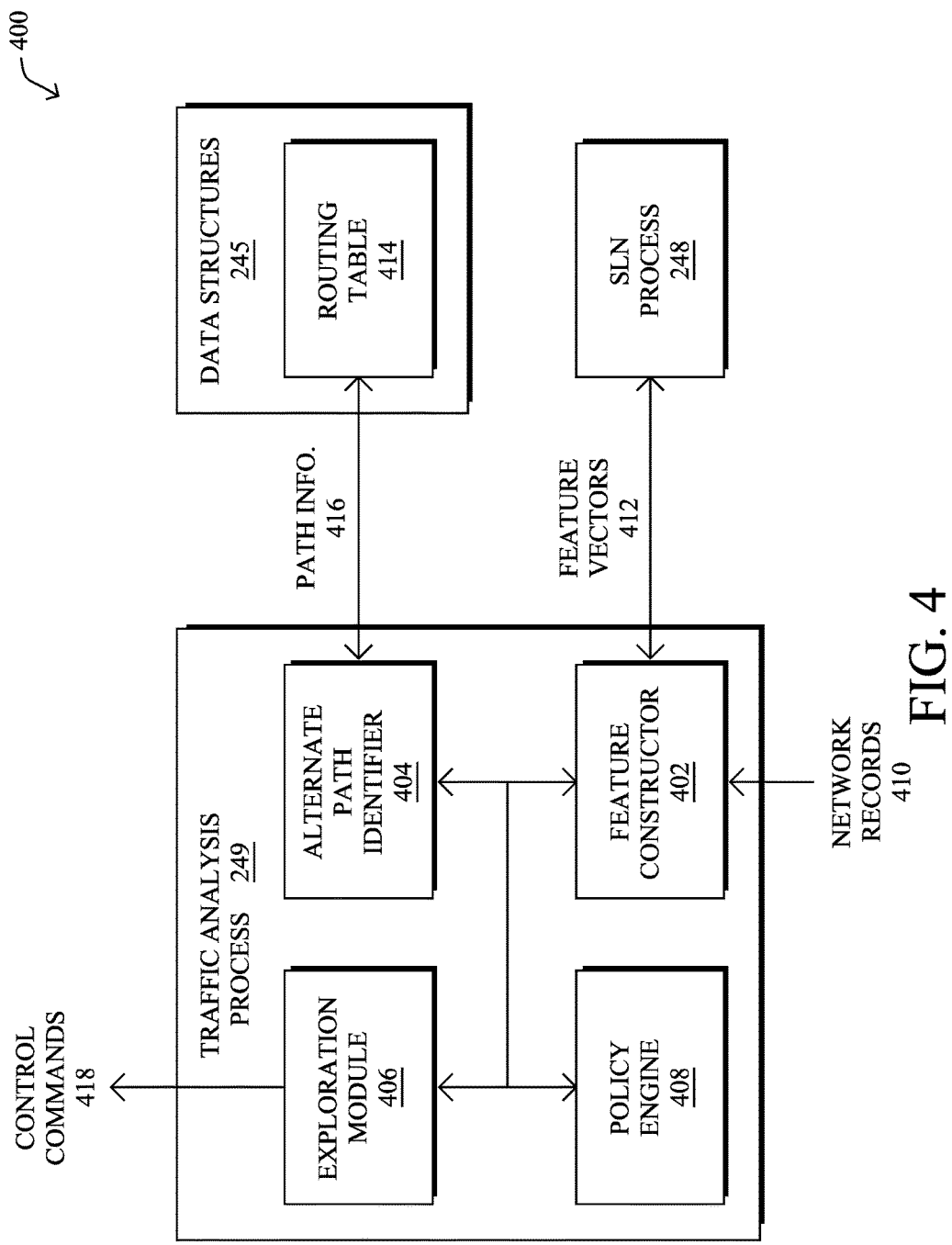
FIG. 4 illustrates an example architecture for performing anomaly detection in a network.

Operationally, an architecture 400 for performing anomaly detection in a network is illustrated in FIG. 4, according to various embodiments. As noted previously, one or more devices (e.g., device 200) may include an SLN process 248 and/or a traffic analysis process 249 that work in conjunction to detect anomalous behavior in a network. In particular, in various embodiments, traffic analysis process 249 may include a feature constructor 402, an alternate path identifier 404, an exploration module 406, and/or a policy engine 408.

In general, feature constructor 402 may be configured to take as input network records 410 and, in turn, provide feature vectors 412 to SLN process 248. In various embodiments, network records 410 may comprise a stream of asynchronous records z, provided by traffic monitoring mechanisms such as Netflow, AVC, OnePK, etc. In turn, feature constructor 402 may turn the stream of asynchronous records into synchronous, fixed-sized feature vectors 412, in one embodiment. For example, the asynchronous updates in network records 410 may have the following format:

TABLE 1

| ID | Field | Type | Description |
|---|---|---|---|
| 1 | INTERVAL_START_TIME | Timestamp | Timestamp of the update |
| 2 | INTERVAL_DURATION | Duration | Duration of the update |
| 3 | APP_ID | Categorical | Application ID reported by NBAR2 |
| 4 | FLOW_ID | Categorical | Flow ID |
| 5 | SRC_IP | Categorical | Source IP address |
| 6 | DST_IP | Categorical | Destination IP address |
| 7 | SRC_PORT | Categorical | Source port |
| 8 | DST_PORT | Categorical | Destination port |
| 9 | IN_BYTES | Integer | Number of ingress bytes |
| 10 | IN_PKTS | Integer | Number of ingress packets |

TABLE 1-continued

| ID | Field | Type | Description |
|---|---|---|---|
| 11 | OUT_BYTES | Integer | Number of egress bytes |
| 12 | OUT_PKTS | Integer | Number of egress packets |
| 13 | DELAY | Real | Delay experienced by the application |
| 14 | JITTER | Real | Jitter experienced by the application |
| 15 | LOSS | Real | Loss experienced by the application |

Other formats may be used in other embodiments, as would be appreciated.

Feature constructor 402 may aggregate these updates and create a fixed-size feature vector that can be passed to a learning machine process (e.g., SLN process 248). Generally, in the field of machine learning, a feature vector refers to an n-dimensional set of observable and measurable properties of a system. In some embodiments, to generate a feature vector $x_i$, feature constructor 402 may perform the following distinct steps:

Accumulate entries $z_1, \ldots z_N$ over the time interval $[t_i, t_{i+1}]$ where N depends on the rate of arrival of the vectors $z_1, \ldots z_N$.

Each entry is keyed by a set of properties that are relevant to application performance.

In one embodiment, feature constructor 402 may perform what is referred to herein as an application-wise expansion, whereby new features are created for each quantitative metric and each "relevant" combination of the categorical columns. For instance, feature constructor 402 may expand/create a set of features IN_BYTES_APPX_PATHY, which denotes the number of ingress bytes for application X along path Y. Of course, the number of such features grows rapidly with the number of applications and paths. For instance, twenty five applications that use ten different paths may lead to 250 columns per numerical metric. Since in the above example, there are 7 quantitative metrics, this may result in 1,750 features.

While this expansion leads to a seemingly intractable dimensionality, it actually allows SLN process 248 to discover those dimensions that are correlated with each other via a process called dimensionality reduction. Several techniques may be used to reduce the dimensionality of a dataset such as, e.g., principal component analysis (PCA). PCA is the orthogonal projection of the data onto a lower dimensional linear space, known as the principal subspace, such that the variance of the projected data is maximized. Maximizing the variance is actually equivalent to minimizing the distance between the points and their projections.

In the process of dimensionality reduction, redundant dimensions are "merged" into so-called principal components (or, in the context of PCA, aligned along those). Interestingly, one can often interpret a posteriori these components as underlying properties of the higher level dimensions. In the context of network traffic data, one could expect principal components to denote "types" of application, such as UDP vs. TCP, batch (file transfer) vs. interactive (instant messaging), their class of service, etc., as they would exhibit different statistical profiles and therefore be captured as individual components of the dataset. These principal components play a fundamental role in the process of network sensing. Indeed, they relate different applications with each other. For instance, if applications A and C have similar experience because they are both interactive TCP-based, their projection to and from the principal subspace would reflect this similarity. This means that if application A is currently experiencing a degradation of its mean opinion score (MOS) along a given path, application C is likely to experience the same degradation. Because the expansion used herein can made on a per-application and per-path basis and the dataset may contain temporal data, the procedure could even capture much more subtle correlations due to the nature of the path (if, say, a shaper is present for certain types of application on a path, but not on another) or even the time of the day (some applications may be correlated only at certain times).

One challenge of application-wise expansion is that, at any given point in time, some applications may be inactive, thereby leading to missing data. Indeed, while one can safely assume that the traffic generated by an application A is zero if this application is inactive, performance metrics such as delay, jitter or loss need to be marked as missing. For example, even though application A is not active, one cannot simply say that the delay for traffic associated with application A is zero. Notably, if application A were active, its delay, by definition, would definitely be non-zero. Accordingly, the input feature vectors 412 from feature constructor 402 may comprise only partially observed metrics regarding the application traffic flows in the network.

In various embodiments, the learning machine of SLN process 248 may be configured to analyze streams of feature vectors 412 that include only partially observed features. In other words, SLN process 248 may be configured to analyze the performance of the network and detect anomalous behavior, even if a particular feature/observable metric is missing in feature vectors 412. In some embodiments, SLN process 248 may replace any missing data in feature vectors 412 with a previously observed value or attempt to blindly "guess" the value. However, these approaches fail when no value has been observed since the initialization of the system. Additionally, these approaches also lead to poor results when many features are missing. An alternative approach is for SLN process 248 to use a probabilistic model, which allows a confidence measure to be associated with the input data. In the case of missing data, setting this confidence to a very low value informs the model that it should not rely on this quantity. Probabilistic PCA is a variant of the basic PCA approach that provides such a capability.

Given the state of the system, some entries may be missing from feature vectors 412 for which SLN process 248 may predict values. In one example, assume that the following initial state exists:

TABLE 2

| ... | AppA_Traffic | AppA_MOS | AppB_Traffic | AppB_MOS | AppC_Traffic | AppC_MOS | ... |
|---|---|---|---|---|---|---|---|
| | 24.3 KB/s | 4.3 | 0.0 | N/A | 67.5 KB/s | 4.2 | |

In the current state, only application A and C are active (e.g., sending traffic in the network), and since application B is inactive, its MOS value is missing. In such a case, SLN process 248 may infer the MOS of application B with traffic of 34.2 KB/s. In this case, SLN process 248 may simply modify the vector accordingly, as shown in Table 3 below:

The learning machine of SLN process 248 may then map this vector onto its principal subspace, and reconstruct a fully observed system state. Doing so, it may exploit the correlations observed during the training to infer the MOS of application B. Of course, the reconstructed vector may be quite different from the original query, even in its observed variables. This is expected and desirable, as one expects indeed that adding traffic will impact other applications. The ability of the model of SLN process 248 to capture this effect can be further improved by performing density estimation in the principal subspace, and optimizing the original projection, to maximize its likelihood given the observed data.

To achieve a desired level of performance, traffic analysis process 249 may work in conjunction with SLN process 248 to perform some level of exploration of the feature space, e.g., to train the machine learning model of SLN process 248 with training data that is sufficiently varied, evenly distributed in the feature space, and sufficiently close to the actual trajectory of the system.

In some aspects, processes 248-249 may employ mechanisms that control the system to explore the feature space in an optimal manner, thereby enabling an active sensing strategy. Note, however, that probing is not used in accordance with the teachings herein. Instead, processes 248-249 may adjust the system such that actual application traffic is used to collect the data points in an optimal manner. For example, traffic for a specific application may be actively rerouted along a path of interest, even though other, potentially more ideal paths are available for the application traffic.

Exploration of the feature space is not without costs, however. Notably, directing application traffic along a path other than its optimal path may affect the application experience and should be performed with great care. Thus, a tradeoff may be made by architecture 400 between exploitation and exploration. In particular, some level of exploration may be needed to train the model of SLN process 248, which can then be exploited for achieving a much better application experience. In one embodiment, this type of online, active learning may be implemented via reinforcement learning, which acts to optimize, in real time, a reward that combines the system performance (exploitation) and the learning rate (exploration). To facilitate exploration of the feature space without sending probe packets into the network, traffic analysis process 249 may include alternate path identifier 404, an exploration module 406, and/or a policy engine 408.

In various embodiments, alternate path identifier 404 may be configured to identify all available paths for a flow of application traffic, in addition to the primary path (e.g., the

TABLE 3

| ... | AppA_Traffic | AppA_MOS | AppB_Traffic | AppB_MOS | AppC_Traffic | AppC_MOS | ... |
|---|---|---|---|---|---|---|---|
| | 24.3 KB/s | 4.3 | 34.2 KB/s | N/A | 67.5 KB/s | 4.2 | | path in use). For example, as shown, alternate path identifier 404 may inspect routing table 414 in data structures 245 to discover alternate (e.g., less preferred) paths on a given router/DLA hosting routing table 414. For example, a customer equipment (CE) device may be equipped with a set of interfaces comprising a primary interface and one or more backup interfaces. In some cases, this may be extended to discover other routers co-hosted on the same remote site. Once the path information has been identified, alternate path identifier 404 may provide this information to exploration module 406.

As noted previously, it is not uncommon to have several CEs connected to a remote site, where the primary CE is used to carry the traffic under normal circumstances (with one or more interfaces) and the second router connected to a backup interface (e.g. LTE, 4G link). In such a situation the traffic may be transparently rerouted to the second CE using a protocol such as the Virtual Router Redundancy Protocol (VRRP). When such a protocol is available, the first CE1 may send a custom message to the second CE2 in order to retrieve its set of paths $P_1, \ldots, P_j$ available for a given destination (which may be the default route). In another embodiment, such a path discovery message may be sent to all co-hosted CE configured on a first CE. Upon discovering the set of local and remote path, the first CE1 expands its routing table to all path available $P_1, \ldots, P_j, \ldots, P_k$.

Figure 5A:
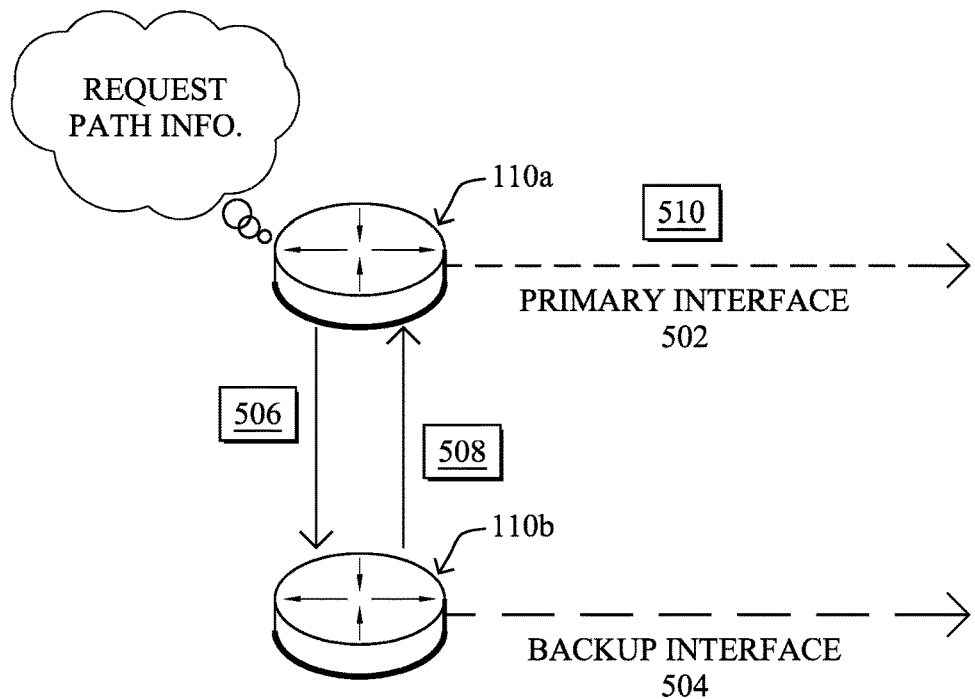
FIGS. 5A-5C illustrate example exploration measures for an anomaly detector.

For example, as shown in FIG. 5A, assume that a first router 110a is connected to a primary interface 502 and a second router 110b is connected to a backup interface 504. If router 110a is also configured as a DLA, router 110a may send a request 508 to router 110b, to retrieve its available paths to a given destination. In response, router 110b may retrieve the requested information from its routing table and send a response message 508 back to router 110a including the requested path information.

Figure 5B:
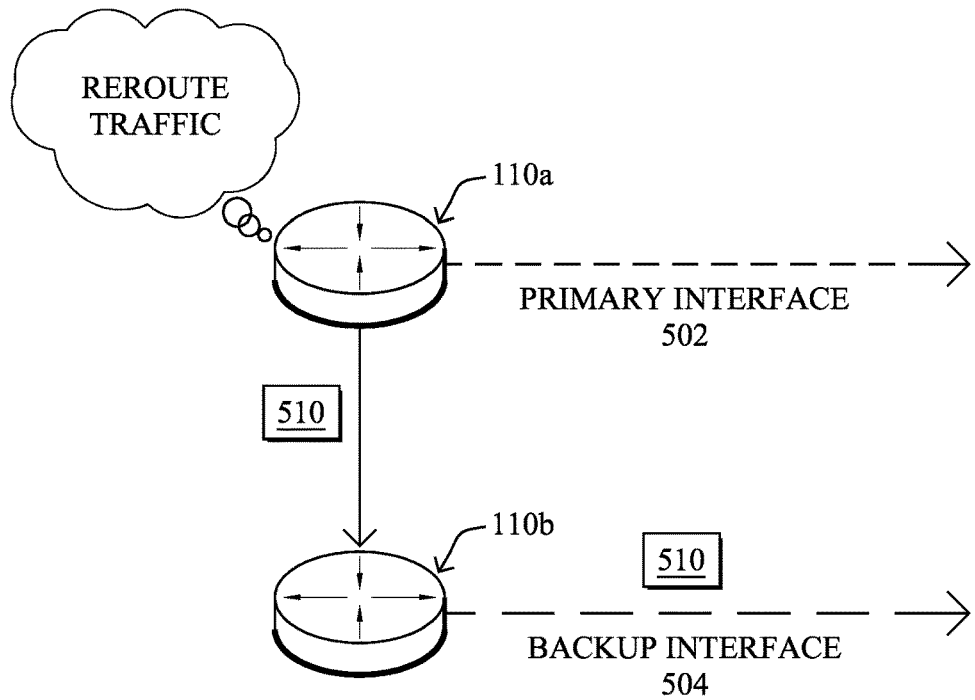

Referring again to FIG. 4, exploration module 406 may be configured to control the network element by issuing control commands 418, to explore the space of interest. As mentioned earlier, exploration module 406 may reroute traffic of specific applications via non-default paths, to explore the feature space. For example, as shown in FIG. 5B, router 110a may reroute traffic 510 associated with a particular application along its backup path, instead of its primary path.

Figure 5C:
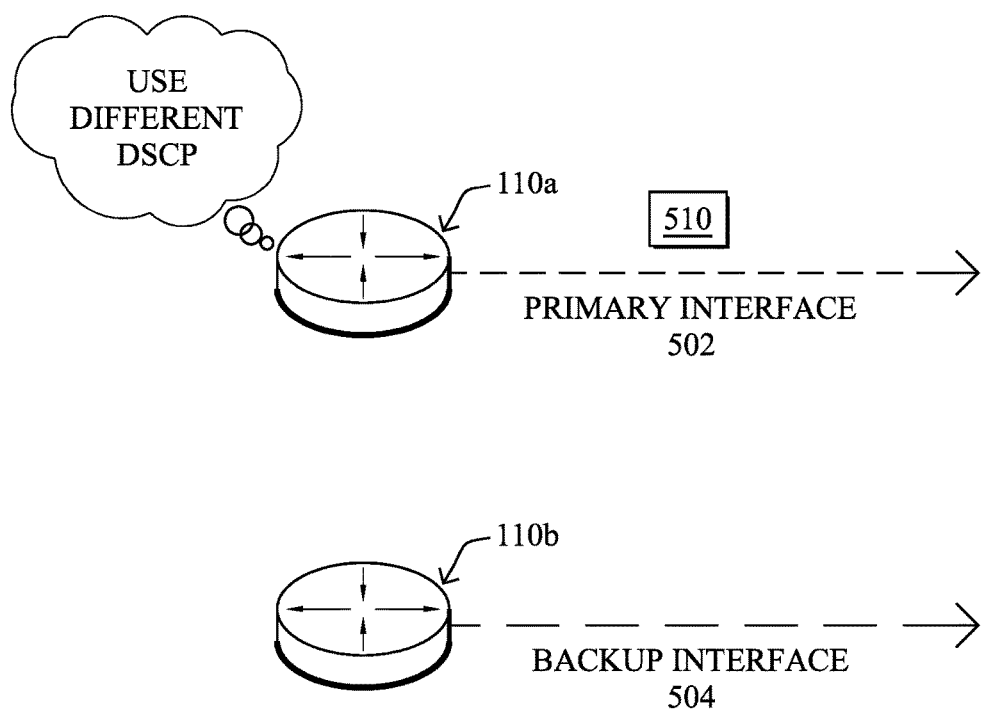

In another embodiment, exploration module 406 may temporarily alter the marking of the traffic associated with a particular application. For example, as shown in FIG. 5C, assume that router 110a determines that not enough observation data exists with respect to a specific differentiated services code point (DSCP) value. In such a case, router 110a may alter the DSCP of application traffic 510, to obtain the missing observation data. This type of exploration may be driven by a reinforcement learning approach. Notably, at each time step, exploration module 406 may evaluate the various control decisions it can make (e.g., marking, routing, shaping, etc.) and a reward metric, which quantifies the expected information gain vs. the expected impact on the application experience. For example, exploration module 406 may make exploration decisions in an attempt to maximize the reward metric. At the beginning, the underlying model of SLN process 248 has not been exposed to many training examples. Consequently, the expected information gain will typically be large, thereby favoring performing an exploration action. However, as SLN process 248 learns about the dynamics of the system, the expected information gain will decrease. In such a case, exploration module 406 may begin favoring the application experience over performing an exploration action.

As shown in FIG. 4, traffic analysis process 249 may also include a policy engine 408 configured to control under which conditions exploration module 406 may initiate an exploration action (e.g., by redirecting traffic to a less preferred path, using a different DSCP than normally used for the traffic, etc.). For example, policy engine 408 may indicate to exploration module 406 that a given type of traffic T1 (e.g., specified by source, destination, application ID, . . . ) may not be rerouted along a path P1 unless certain conditions are met. In other words, policy engine 408 may constrain the exploration decisions of exploration module 406. In other embodiments, policy engine 408 may adjust the parameters of the reward function in exploration module 406, thereby introducing soft constraints in the exploration decisions. For example, policy engine 408 may make the user experience of certain applications more critical than others.

Figure 6:
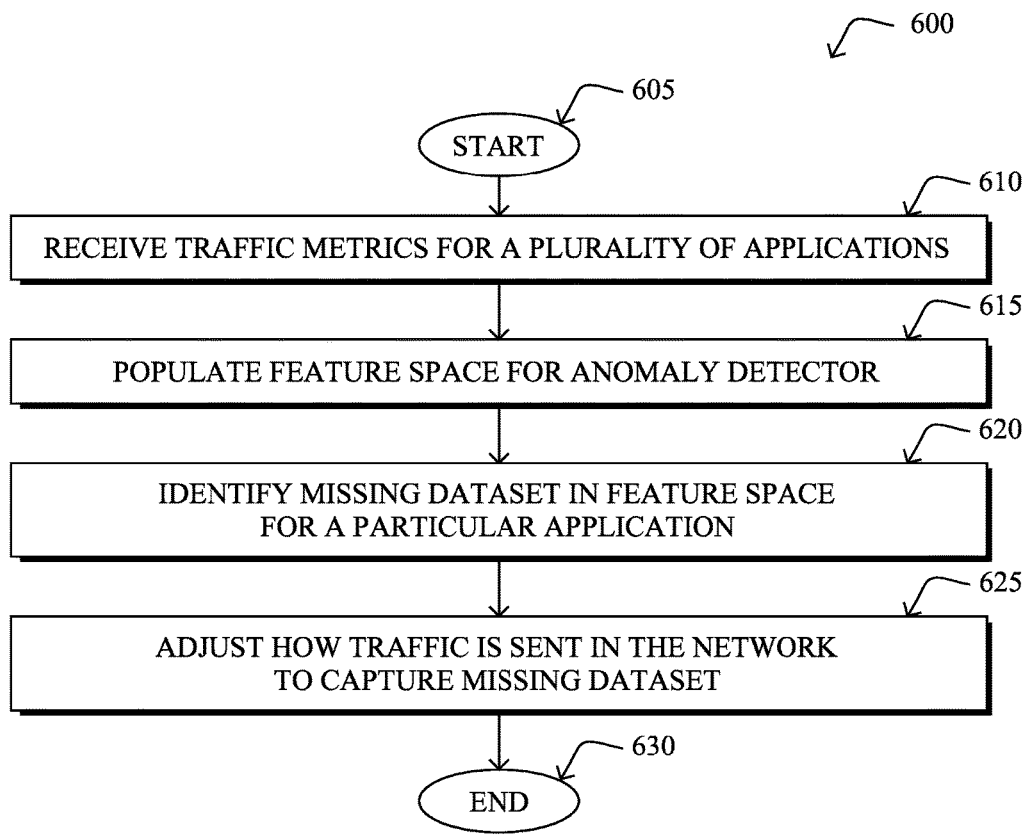
FIG. 6 illustrates an example simplified procedure for adjusting how application traffic is sent, to capture a missing feature dataset.

FIG. 6 illustrates an example simplified procedure for adjusting how application traffic is sent, to capture a missing feature dataset. Procedure 600 may be performed by one or more devices in a network (e.g., device 200 described above) executing stored instructions (e.g., procedures 248-249). Procedure 600 may start at step 605 and continue on to step 610 where, as described in greater detail above, the device may receive traffic metrics for a plurality of applications. For example, the device may receive traffic records from network monitoring mechanisms such as AVC, Netflow, and/or OnePK by Cisco Systems, Inc., or similar mechanisms by other entities, that provides observed metrics regarding the performance of traffic on a per-application basis (e.g., web traffic, video traffic, etc.).

At step 615, the device may populate a feature space for a machine-learning based anomaly detector using the received application traffic metrics, as described in greater detail above. For example, the device may construct fixed-length feature vectors from the streams of incoming application traffic metrics and use the feature vectors as input to a machine learning-based anomaly detector. In other words, the anomaly detector may be trained using the collected/observed application traffic metrics and, based on the trained model, detect when the behavior of the network is anomalous.

At step 620, as detailed above, the device may identify a missing dataset in the feature space for one of the applications in the network. Notably, traffic for different applications may be present in the network at different times, leading to one or more missing metrics in the feature space based on the traffic metrics received in step 610. For example, assume that application A has not been active in a long period of time, leading to a gap in the traffic information for the application. In such a case, the device may identify the one or more missing metrics for the application from the received traffic metrics from the network.

At step 625, the device may adjust how traffic is sent in the network, to capture the missing feature dataset, as described in greater detail above. In some embodiments, the device may reroute traffic along one or more non-primary paths, to explore the feature space. In another embodiment, the device may alter the DSCP of the traffic, to explore the feature space. Other exploration actions may be taken in other embodiments. In some cases, the device may only make such an adjustment if doing so does not violate a set policy and/or if the benefits outweigh the potential adverse effects on the adjusted traffic. For example, the device may only adjust how the traffic is sent, if the traffic is deemed non-critical according to a policy. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

As would be appreciated, the techniques herein differ from existing mechanisms (e.g., performance routing mechanisms, etc., in that these mechanisms rely on active probing and are not, fundamentally, designed to infer network characteristics. Indeed, the techniques herein allow for estimating quantities that are not directly provided by any existing technologies leveraged by performance routing mechanisms. Note also that performance routing mechanisms determine the network characteristics and, in particular when SLAs are not met, make use of a combination of alarms (TCA) sent by the remote device. The techniques described herein, provide for the unsupervised estimation and optimization of application-centric metrics (e.g., for purposes of anomaly detection, for purposes of monitoring/alerting, etc.). In some aspects, the techniques herein allow for WAN optimization and behavioral analysis of the network, without the use of probes.

While there have been shown and described illustrative embodiments that provide for inferring network conditions based on network traffic, it is to be understood that various other adaptations and modifications may be made within the spirit and scope of the embodiments herein. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device in a network, traffic metrics for a plurality of applications in the network;
   building, by the device, a feature space for a machine learning-based anomaly detector based on the received traffic metrics, wherein the feature space is made up of fixed-length feature vectors from the received traffic metrics and uses the feature vectors as input to the machine learning-based anomaly detector;
   identifying, by the device, a missing dataset in the feature space of a machine learning algorithm of the machine learning based anomaly detector for a particular one of the plurality of applications, wherein the missing dataset is an inferred unobserved network property in the feature space of the machine learning algorithm associated with the particular one of the plurality of applications that results in the feature space only being partially observed, wherein the anomaly detector is configured to infer a behavior of traffic for a first application based on a behavior of traffic for a second application represented in the feature space; and
   adjusting, by the device, how traffic associated with the particular one of the plurality of applications is sent in through the network to capture the missing dataset.

2. The method as in claim 1, further comprising:
   training, by the device, the anomaly detector with the feature space populated with the missing dataset; and
   detecting, by the device, an anomaly in the network by analyzing the received traffic metrics using the trained anomaly detector.

3. The method as in claim 1, wherein adjusting how traffic is sent in the network comprises:
   altering, by the device, a differentiated services code point (DSCP) value for a particular type of traffic; and
   routing the particular type of traffic using the altered DSCP value.

4. The method as in claim 1, wherein adjusting how traffic is sent in the network comprises:
   identifying, by the device, an alternate path in the network for traffic for the particular application; and
   routing, by the device, the traffic for the particular application along the alternate path.

5. The method as in claim 1, wherein identifying the alternate path comprises:
   querying, by the device, path information maintained by another device associated with a backup network interface.

6. The method as in claim 1, wherein the device adjusts how traffic is sent in the network, in response to determining that an importance of the missing dataset outweighs a cost associated with adjusting how the traffic is sent.

7. The method as in claim 1, wherein the device adjusts how traffic is sent in the network for the particular application, based on a policy associated with the particular application.

8. The method as in claim 1, wherein populating the feature space for the machine learning-based anomaly detector comprises:
   aggregating the received traffic metrics into fixed-size feature vectors.

9. An apparatus, comprising:
   one or more network interfaces to communicate with a computer network;
   a processor coupled to the one or more network interfaces and configured to execute a process; and
   a memory configured to store the process executable by the processor, the process when executed configured to:
   receive traffic metrics for a plurality of applications in the network;
   build a feature space for a machine learning-based anomaly detector based on the received traffic metrics, wherein the feature space is made up of fixed-length feature vectors from the received traffic metrics and uses the feature vectors as input to the machine learning-based anomaly detector;
   identify a missing dataset in the feature space of a machine learning algorithm of the machine learning based anomaly detector for a particular one of the plurality of applications, wherein the missing dataset is an inferred unobserved network property in the feature space of the machine learning algorithm associated with the particular one of the plurality of applications that results in the feature space only being partially observed, wherein the anomaly detector is configured to infer a behavior of traffic for a first application based on a behavior of traffic for a second application represented in the feature space; and adjust how traffic associated with the particular one of the plurality of applications is sent through the network, to capture the missing dataset.

10. The apparatus as in claim 9, wherein the process when executed is further configured to:
train the anomaly detector with the feature space populated with the missing dataset; and
detect an anomaly in the network by analyzing the received traffic metrics using the trained anomaly detector.

11. The apparatus as in claim 9, wherein the apparatus adjusts how the traffic is sent in the network by:
altering a differentiated services code point (DSCP) value associated with a particular type of traffic; and
routing the particular type of traffic using the altered DSCP value.

12. The apparatus as in claim 9, wherein the apparatus adjusts how the traffic is sent in the network by:
identifying an alternate path in the network for traffic for the particular application; and
routing the traffic for the particular application along the alternate path.

13. The apparatus as in claim 12, wherein the apparatus identifies the alternate path by:
querying path information maintained by another device associated with a backup network interface.

14. The apparatus as in claim 9, wherein the apparatus adjusts how traffic is sent in the network, in response to determining that an importance of the missing dataset outweighs a cost associated with adjusting how the traffic is sent.

15. The apparatus as in claim 9, wherein the apparatus adjusts how the traffic is sent in the network, based on a policy associated with the particular application.

16. The apparatus as in claim 9, wherein the apparatus populates the feature space for the machine learning-based anomaly detector by:
aggregating the received traffic metrics into fixed-size feature vectors.

17. A tangible, non-transitory, computer-readable medium storing program instructions that cause a computer to execute a process comprising:
receiving traffic metrics for a plurality of applications in the network;
building a feature space for a machine learning-based anomaly detector based on the received traffic metrics, wherein the feature space is made up of fixed-length feature vectors from the received traffic metrics and uses the feature vectors as input to the machine learning-based anomaly detector;
identifying a missing dataset in the feature space of a machine learning algorithm of the machine learning based anomaly detector for a particular one of the plurality of applications, wherein the missing dataset is an inferred unobserved network property in the feature space of the machine learning algorithm associated with the particular one of the plurality of applications that results in the feature space only being partially observed, wherein the anomaly detector is configured to infer a behavior of traffic for a first application based on a behavior of traffic for a second application represented in the feature space; and
adjusting how traffic associated with the particular one of the plurality of applications is sent in through the network to capture the missing dataset.

18. The tangible, non-transitory, computer-readable medium as in claim 17, wherein the process further comprises:
training the anomaly detector with the feature space populated with the missing dataset; and
detecting an anomaly in the network by analyzing the received traffic metrics using the trained anomaly detector.

* * * * *

UNITED STATES PATENT AND TRADEMARK OFFICE
CERTIFICATE OF CORRECTION

PATENT NO. : 10,320,824 B2  
APPLICATION NO. : 14/989920  
DATED : June 11, 2019  
INVENTOR(S) : Jean-Philippe Vasseur et al.

Page 1 of 1

It is certified that error appears in the above-identified patent and that said Letters Patent is hereby corrected as shown below:

In the Specification

In Column 3, Line 5, please amend as shown:  
network backbone 130. For example, routers 110,120 may be In Column 3, Line 37, please amend as shown:  
2a.) Site Type B1:a site connected to the network using Signed and Sealed this  
Eleventh Day of February, 2020

Andrei Iancu  
*Director of the United States Patent and Trademark Office*